(12) United States Patent
Yokoyama et al.

(10) Patent No.: US 12,242,907 B2
(45) Date of Patent: Mar. 4, 2025

(54) CARD TRANSPORT UNIT

(71) Applicant: NIDEC SANKYO CORPORATION, Nagano (JP)

(72) Inventors: Satoshi Yokoyama, Nagano (JP); Keiji Ohta, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 342 days.

(21) Appl. No.: 17/711,161

(22) Filed: Apr. 1, 2022

(65) Prior Publication Data

US 2022/0318578 A1 Oct. 6, 2022

(30) Foreign Application Priority Data

Apr. 1, 2021 (JP) ................................. 2021-062703

(51) Int. Cl.
| | | |
|---|---|---|
| *G06K 13/14* | (2006.01) | |
| *B65H 29/12* | (2006.01) | |
| *B65H 43/00* | (2006.01) | |
| *G06K 7/10* | (2006.01) | |
| *G06K 13/103* | (2006.01) | |

(52) U.S. Cl.
CPC ......... *G06K 13/103* (2013.01); *B65H 29/125* (2013.01); *B65H 43/00* (2013.01); *G06K 7/10316* (2013.01); *G06K 13/14* (2013.01); *B65H 2701/1914* (2013.01)

(58) Field of Classification Search
CPC ........................... G06K 13/14; G06K 7/10316
See application file for complete search history.

(56) References Cited

U.S. PATENT DOCUMENTS

| | | | | |
|---|---|---|---|---|
| 8,807,436 | B2 * | 8/2014 | Watanabe .......... | G06K 7/10316 235/475 |
| 2003/0155370 | A1 * | 8/2003 | Martin ................... | B65H 3/24 221/131 |
| 2008/0271556 | A1 * | 11/2008 | Imamura .......... | F16H 57/02004 399/167 |
| 2017/0107069 | A1 * | 4/2017 | Ohta ..................... | B65H 31/24 |

FOREIGN PATENT DOCUMENTS

JP 2007041635 A 2/2007

\* cited by examiner

*Primary Examiner* — Howard J Sanders
(74) *Attorney, Agent, or Firm* — CANTOR COLBURN LLP

(57) ABSTRACT

A card transport unit transports a card ejected one-by-one from a card housing section to a card processing section, and includes: a carriage that is moved in a carriage transport path provided between the card housing section and the card processing section; a contactless card reader that includes a contactless communication antenna making contactless communication with the card; and a support member that holds the contactless communication antenna at a position opposing the carriage transport path. The carriage includes a card transport mechanism that transports the card in a card transport direction intersecting a movement direction of the carriage, and the card transport mechanism includes a motor. The motor is arranged on an opposite side of the card, which is transported by the card transport mechanism, from the contactless communication antenna.

12 Claims, 7 Drawing Sheets

CARD TRANSPORT UNIT

CROSS REFERENCE TO RELATED APPLICATION

The present application claims priority under 35 U.S.C. § 119 to Japanese Application No. 2021-062703 filed on Apr. 1, 2021, the entire content of which is incorporated herein by reference.

BACKGROUND

Field of the Invention

At least an embodiment of the present invention relates to a card transport unit that transports a card on which magnetic information is recorded.

Description of the Related Documents

A card processor (a card issuing device) that issues cards, such as a card on which magnetic information is recorded and an integrated circuit ("IC") card having an IC chip, is disclosed in Japanese Patent Application Publication No. 2007-41635. The card processor disclosed in Japanese Patent Application Publication No. 2007-41635 includes: a card housing section (a card stacking section) that houses a large number of cards in a stack; a card processing section that writes/reads information on/from the card; and a card transport section that transports the card taken out from the card housing section to the card processing section.

In the card processor disclosed in Japanese Patent Application Publication No. 2007-41635, the card housing section includes the plural card stacking sections. The card transport section includes: a guide shaft that extends in an arrangement direction of the card stacking sections; and a carriage that is moved along the guide shaft. A roller pair that holds the card therebetween and transports the card is mounted on the carriage. In card issuing operation, the carriage is moved and stopped in front of the card stacking section, the card ejected from the card stacking section is taken into the carriage by the roller pair, and the carriage is then moved again and stopped right before the card processing section. Then, the roller pair is driven to feed the card into the card processing section. The card processing section reads the information recorded on the card by using a card reader, and records necessary information on the card.

The card readers, each of which reads the information from the card by using a contactless communication antenna, are manufactured in various specifications and shapes. However, due to limitations on an attachment method and an attachment space, it is difficult to incorporate the card reader into the card processing section unless the card reader is a dedicated card reader that is compatible with a configuration of the card processing section.

To handle such a problem, the contactless communication antenna is installed at a position opposing the carriage in the card transport section, and the information recorded on the card is read by using the contactless communication antenna while the card passes through the carriage. In this way, the limitations on the card reader for incorporation into the card processing section can be eliminated. As a result, a degree of freedom in selecting the card reader is increased.

However, the carriage includes a mechanism that takes the card and feeds the card, and includes metal components. Thus, in the case where it is configured that the contactless communication antenna is installed at the position opposing the carriage to read the information recorded on the card, the metal components included in the carriage may adversely affect reading of the information.

In view of the above problems, objects of at least an embodiment of the present invention are to increase a degree of freedom in selecting a contactless card reader and to reduce an adverse effect of a contactless communication antenna on reading of information from a card.

SUMMARY

In order to solve the above problems, at least an embodiment of the present invention is a card transport unit that transports a card ejected one-by-one from a card housing section to a card processing section, and includes: a carriage that is moved in a carriage transport path provided between the card housing section and the card processing section; a contactless card reader that includes a contactless communication antenna making contactless communication with the card; and a support member that holds the contactless communication antenna at a position opposing the carriage transport path. The carriage includes a card transport mechanism that transports the card in a card transport direction intersecting a movement direction of the carriage, and the card transport mechanism includes a motor. The motor is arranged on an opposite side of the card, which is transported by the card transport mechanism, from the contactless communication antenna.

According to at least an embodiment of the present invention, the card transport unit that transports the card between the card housing section and the card processing section may include the carriage including the card transport mechanism; and the contactless card reader. The contactless card reader may include the contactless communication antenna that is arranged at the position opposing the carriage transport path. Accordingly, there is no such limitation that the contactless card reader is incorporated into the card processing section. Thus, there is no need to use a dedicated contactless card reader that is compatible with a configuration of the card processing section. Therefore, a degree of freedom in selecting the contactless card reader is high. In addition, since the contactless communication antenna is arranged on the opposite side of the card from the motor of the card transport mechanism, it is possible to avoid an adverse effect on reading of magnetic information, which is caused by arrangement of the motor as a large metal component near the contactless communication antenna.

In an embodiment, the carriage may include a carriage frame that supports the card transport mechanism and the motor, and a portion of the carriage frame that is located on the contactless communication antenna side from the card transported by the card transport mechanism is made of resin. In this way, it is possible to avoid the carriage frame from adversely affecting reading of the magnetic information by the contactless communication antenna.

In an embodiment, the support member may include an opposing section that opposes the carriage transport path in an opposing direction intersecting the card transport direction and intersecting the movement direction; and a leg that is provided at each end of the opposing section in the movement direction, the contactless card reader may include a substrate that is fixed to the opposing section, and the contactless communication antenna may be arranged on the substrate. In this way, the contactless communication antenna can be arranged at a position that does not interfere with a movement path of the carriage and does not interfere with the card housing section and the card processing section. Accordingly, it is possible to alleviate limitations on arrangement spaces for the support member and the contactless communication antenna. Therefore, a degree of freedom in a shape of the support member is high, and the degree of freedom in selecting the contactless card reader is high. In addition, since the shape of the support member can easily be changed, the contactless card reader can easily be changed.

In an embodiment, the contactless communication antenna may oppose the carriage transport path via an opening that is provided to the opposing section. In this way, even when the support member is made of metal, there is no metal interposed between the contactless communication antenna and the card. Thus, it is possible to avoid the support member from adversely affecting reading of the magnetic information by the contactless communication antenna.

In an embodiment, a guide shaft that guides the carriage in the movement direction may be further included, and the guide shaft may be arranged on an opposite side of the card, which is transported by the card transport mechanism, from the contactless communication antenna. In this way, even when the guide shaft is made of metal, the metallic guide shaft is not interposed between the card and the contactless communication antenna. Thus, it is possible to avoid the guide shaft from adversely affecting reading of the magnetic information by the contactless communication antenna.

In an embodiment, the card transport mechanism may include a drive roller that is made of resin and a first rotary shaft that is fixed to a center of the drive roller; a driven roller that is made of resin and holds the card with the drive roller and a second rotary shaft that is fixed to a center of the driven roller; and a gear train that transmits rotation of an output shaft of the motor to the first rotary shaft, and plural gears that constitute the gear train are made of resin. In this way, components constituting the card transport mechanism are made of the resin except for the rotary shafts and the shafts for the gears. Thus, the small number of the metal components is arranged near the card. Therefore, arrangement of the metal component near the contactless communication antenna has no significant adverse effect on reading of the magnetic information.

In an embodiment, the first rotary shaft and the second rotary shaft may be arranged at positions away from an area that opposes the contactless communication antenna. In this way, even when at least one of the rotary shafts is made of the metal, due to absence of the rotary shaft between the card and the contactless communication antenna, it is possible to suppress the adverse effect on reading of the magnetic information by the contactless communication antenna.

According to at least an embodiment of the present invention, the card transport unit that transports the card between the card housing section and the card processing section may include the carriage including the card transport mechanism; and the contactless card reader. The contactless card reader may include the contactless communication antenna that is arranged at the position opposing the carriage transport path. Accordingly, there is no such limitation that the contactless card reader is incorporated into the card processing section. Thus, there is no need to use a dedicated contactless card reader that is compatible with a configuration of the card processing section. Therefore, the degree of freedom in selecting the contactless card reader is high. In addition, since the contactless communication antenna is arranged on the opposite side of the card from the motor of the card transport mechanism, it is possible to avoid the adverse effect on reading of the magnetic information, which is caused by the arrangement of the motor as the large metal component near the contactless communication antenna.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

A description will hereinafter be made on an embodiment of the present invention with reference to the drawings. In the following description, three directions of X, Y, and Z are mutually orthogonal directions. In addition, a description will be made by denoting a first side in the X-direction by X1, a second side in the X-direction by X2, a first side in the Y-direction by Y1, a second side in the Y-direction by Y2, a first side in the Z-direction by Z1, and a second side in the Z-direction by Z2. The X-direction is a front-rear direction of a card issuing device 1. The X1-direction is a back side of the card issuing device 1, and the X2-direction is a front side of the card issuing device 1. The Y-direction is a width direction of the card issuing device 1, and the Z-direction is an up-down direction. The Z1-direction is an upper side, and the Z2-direction is a lower side.

Overall Configuration

Figure 1:
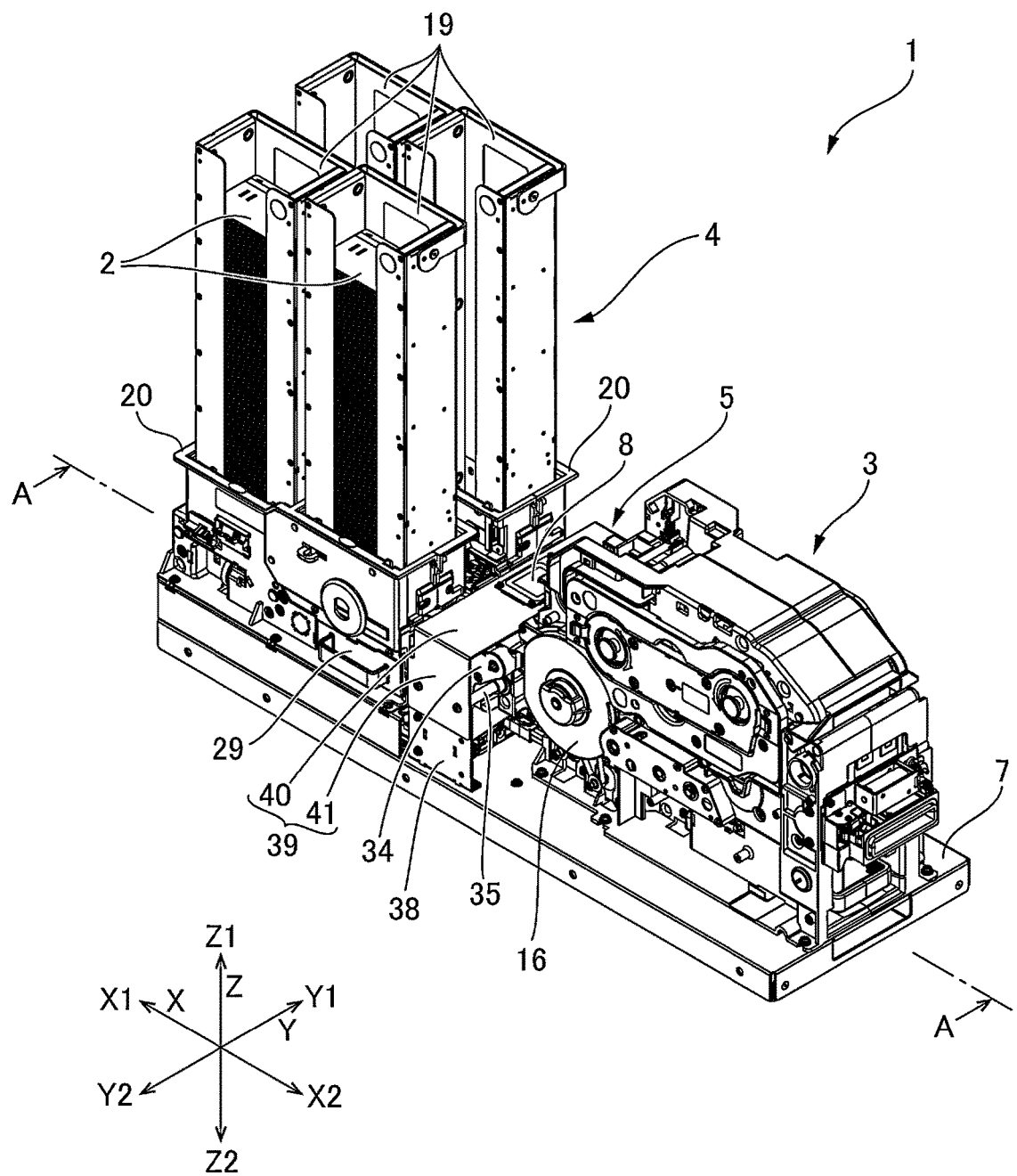
FIG. 1 is an external perspective view of a card issuing device including a card transport unit, to which at least an embodiment of the present invention is applied.
Figure 2:
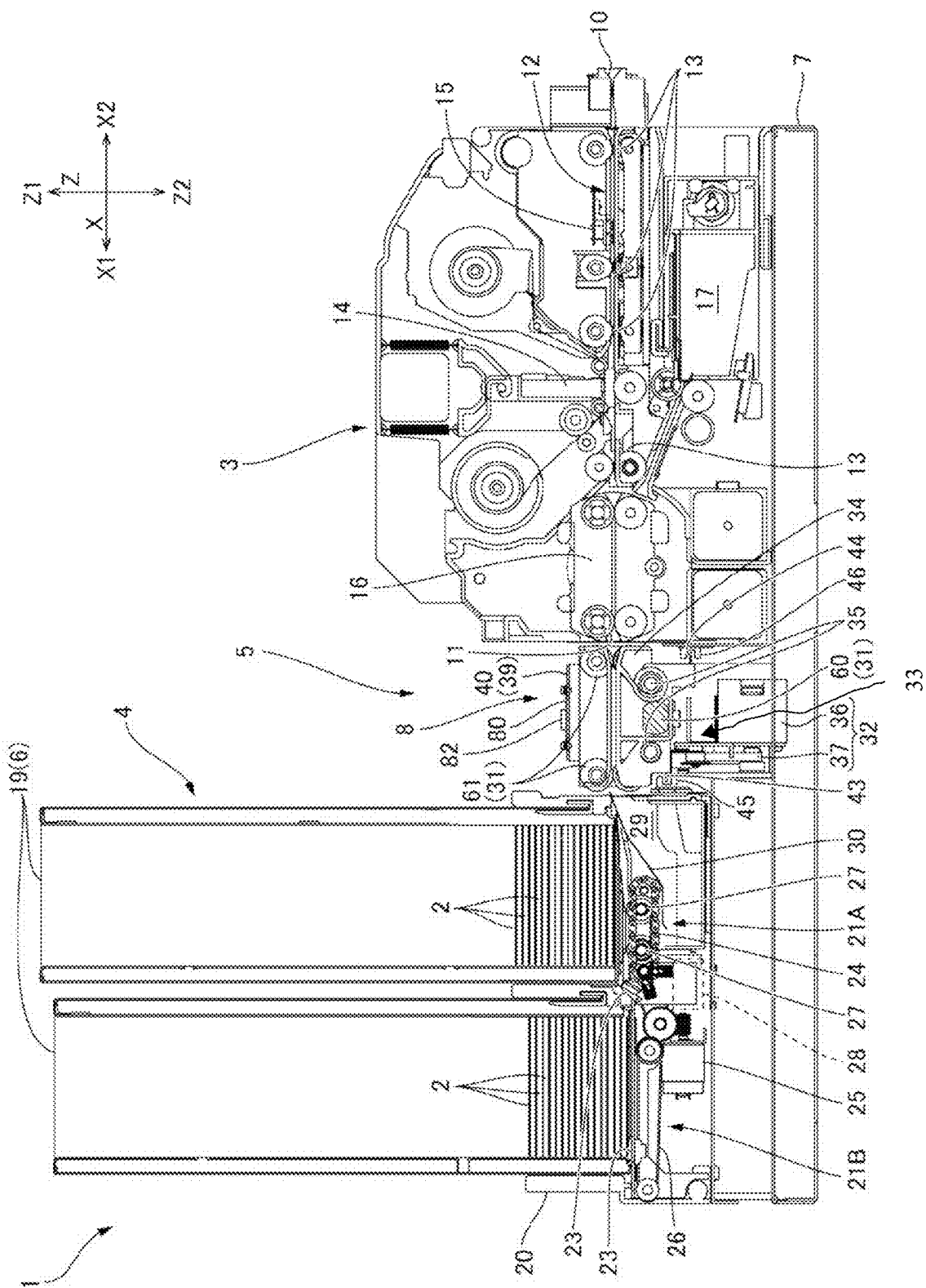
FIG. 2 is a cross-sectional view of the card issuing device in FIG. 1.

FIG. 1 is an external perspective view of the card issuing device 1 including a card transport unit, to which at least an embodiment of the present invention is applied. FIG. 2 is a cross-sectional view of the card issuing device 1 in FIG. 1, and is a cross-sectional view that is taken along position A-A in FIG. 1. The card issuing device 1 issues a card 2 on which predetermined information is recorded. As illustrated in FIG. 1, the card issuing device 1 includes: a card processing section 3 that writes/reads the information on/from the card 2; a card housing section 4 that houses the card 2 before being issued; and a card transport section 5 that transports the cards 2 fed out one-by-one from the card housing section 4 to the card processing section 3.

The card 2 is a contactless IC card having a built-in contactless communication antenna. A contact IC chip is arranged on a surface of the card 2. The card processing section 3 is a card reader with a printer having functions of writing/reading the information on/from the contact IC chip and printing on the surface of the card 2. The card transport section 5 includes a contactless card reader 8 that reads the information from the card 2 via contactless communication while transporting the card 2 in the X-direction.

As illustrated in FIG. 1, the card processing section 3, the card housing section 4, and the card transport section 5 are fixed to a rectangular base 7. The card housing section 4 is arranged in a portion on the X1 side (the back side) of the base 7. The card transport section 5 is arranged on the X2 side (the front side) of the card housing section 4, and the card processing section 3 is arranged on the X2 side (the front side) of the card transport section 5.

The card housing section 4 includes plural card stacking sections 6 and feeds out the cards 2, which are stacked and housed in each of the card stacking sections 6, one-by-one. In the present embodiment, the card housing section 4 has the card stacking sections 6 that are arranged in two rows in the Y-direction. In each of the two rows, the two card stacking sections 6 are arranged in the X-direction. The card transport section 5 is arranged in an area from an end on the Y1 side of the card housing section 4 to an end on the Y2 side thereof, and transports the card 2 in the Y-direction and the X-direction. The card processing section 3 is arranged substantially at a center of the card transport section 5 in the Y-direction. The card transport section 5 transports the card 2, which is fed out from one of the two rows of the card stacking sections 6 to the X2 side (the front side), in the X-direction and takes in the card 2. Then, the card transport section 5 transports the card 2 in the Y-direction, and moves the card 2 to the X1 side (the back side) of the card processing section 3. Thereafter, the card transport section 5 transports the card 2 in the X-direction, and feeds the card 2 into the card processing section 3.

Card Processing Section 3

As illustrated in FIG. 1 and FIG. 2, the card processing section 3 includes a card issuance port 10 that is opened to a front end surface of the device; a card intake port 11 that opposes the card transport section 5; and a card transport path 12 through which the card 2 is transported from the card intake port 11 to the card issuance port 10. A transport roller pair 13 that holds the card 2 therebetween and transports the card 2 is arranged in the card transport path 12. With rotation of a motor (not illustrated) as a drive source, the transport roller pair 13 is rotationally driven by a belt mechanism that includes a pully and a belt.

As illustrated in FIG. 2, the card processing section 3 includes: a printhead 14 that is arranged on the Z1 side (the upper side) of the card transport path 12; and a contact card reader 15 that is arranged on the X2 side (the front side) of the printhead 14. The contact card reader 15 has an IC contact that comes into contact with the IC chip of the card 2. The card processing section 3 also includes: a card reversing mechanism 16 that is arranged on the X1 side (the back side) of the printhead 14; and a card collection section 17 that is arranged on the Z2 side (the lower side) of the card transport path 12. The card processing section 3 feeds out an unnecessary card, which has been taken into the card transport path 12, to the card collection section 17 by the card reversing mechanism 16.

Card Housing Section

Figure 3A:
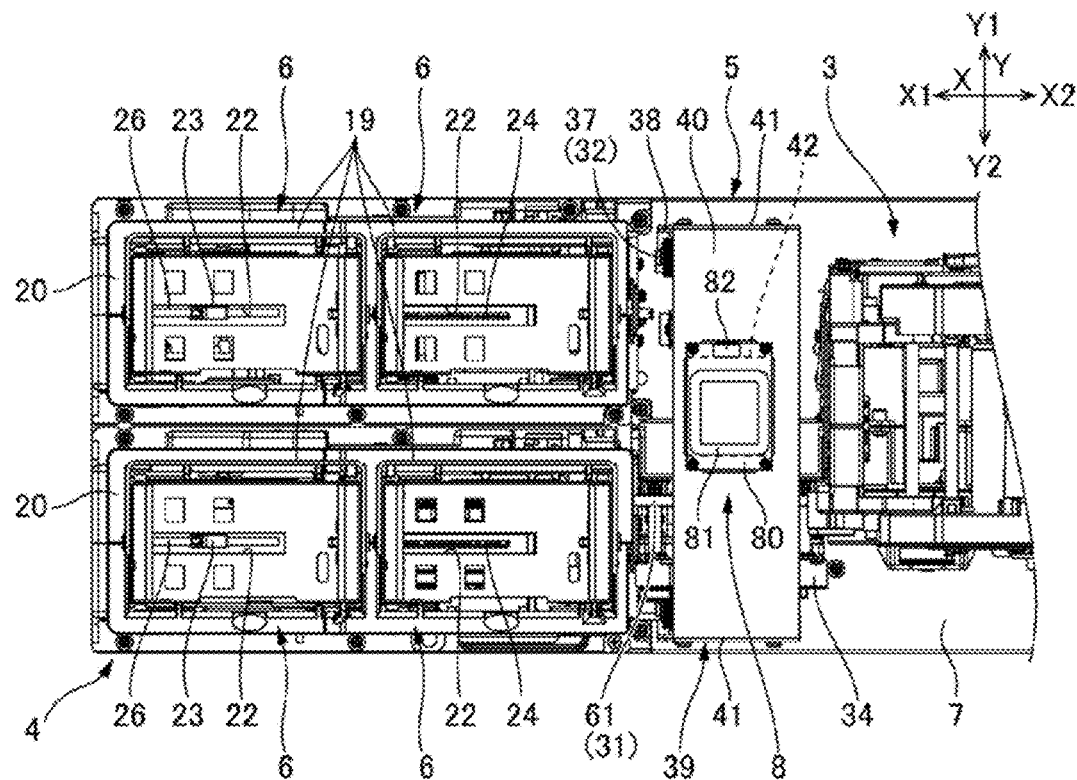
FIG. 3A is a plan view of a card transport section and a card housing section.
Figure 3B:
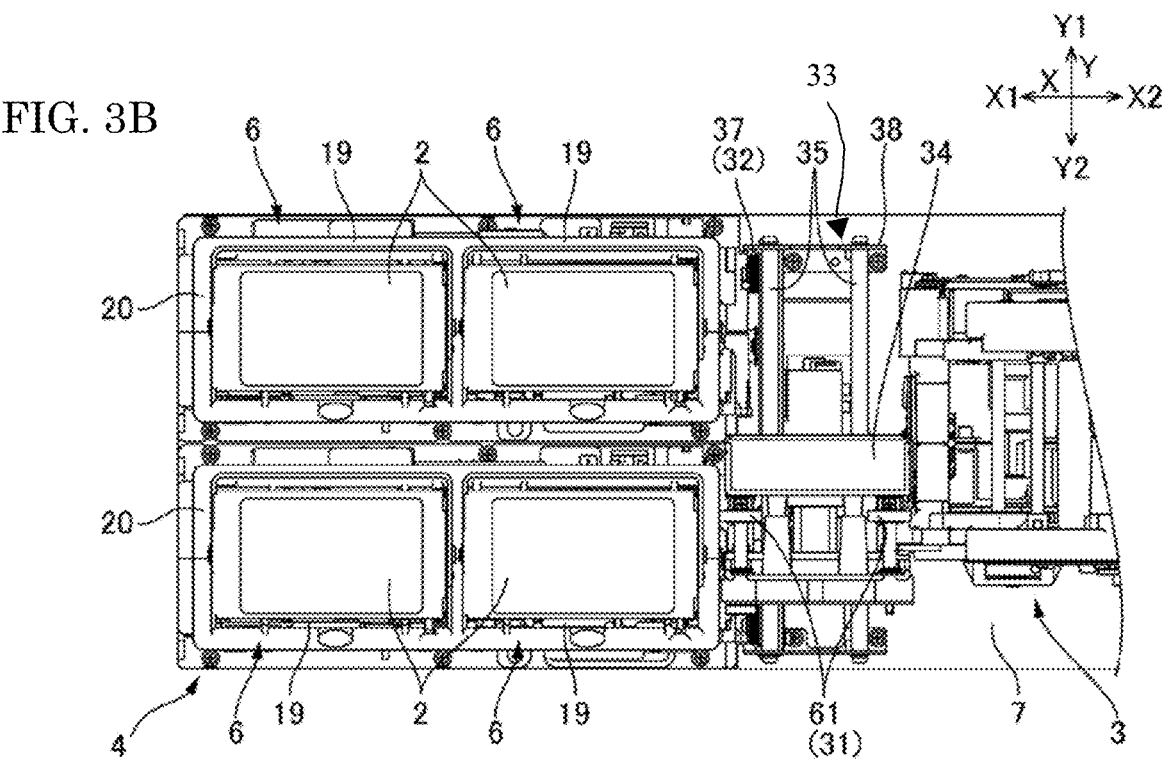
FIG. 3B is a plan view of the card transport section, from which a contactless card reader is removed, and the card housing section.

FIG. 3A is a plan view of the card transport section 5 and the card housing section 4, and illustrates a state where the card 2 is housed in none of the card stacking sections 6. FIG. 3B is a plan view of the card transport section 5, from which the contactless card reader 8 is removed, and the card housing section 4, and illustrates a state where the card 2 is housed in each of the card stacking sections 6. As illustrated in FIG. 1 and FIG. 2, the card stacking section 6 includes a rectangular-parallelepiped cassette 19 having an opened upper end. The cassette 19 is detachably attached to a cassette holder 20.

In the card housing section 4, of the two card stacking sections 6 aligned in the X-direction (the front-rear direction), the card stacking section 6 located on the X2 side (the front side) has a bottom portion provided with a card feed mechanism 21A, and the card feed mechanism 21A feeds out the card 2 in the X2-direction. Meanwhile, a card feed mechanism 21B that feeds out the card 2 in the X2-direction is provided in a bottom portion of the card stacking section 6 that is located on the X1 side (the back side). As illustrated in FIG. 3A, the card feed mechanism 21A and the card feed mechanism 21B each include: a slit 22 that is provided on a bottom surface of the cassette 19 and extends in the X-direction; and card feed jaws 23 that are arranged in the slit 22. The card feed jaws 23 are engaged with an edge of the card 2, which is located at the bottom of the stacked cards 2 in the cassette 19, from the X1 side.

As illustrated in FIG. 2, the card feed mechanism 21A, which is provided in the bottom portion of the card stacking section 6 on the X2 side (the front side), includes: a chain drive mechanism 24 that moves the card feed jaws 23 in the X-direction; and a motor 25 that drives the chain drive mechanism 24. The card feed jaws 23 in the card feed mechanism 21A are fixed to a chain of the chain drive mechanism 24.

The card feed mechanism 21B, which is provided in the card stacking section 6 on the X1 side (the back side), includes: a belt mechanism 26 that moves the card feed jaws 23 in the X-direction; a feed roller 27 that is arranged on the X2 side (the front side) of the belt mechanism 26; and a motor 28 that drives the belt mechanism 26 and the feed roller 27. The card feed jaws 23 in the card feed mechanism 21B are fixed to a belt of the belt mechanism 26. The feed roller 27 is aligned in the Y-direction with the chain drive mechanism 24 in the card feed mechanism 21A. When the card 2 is fed out from the card stacking section 6 on the X1 side (the back side), the card feed mechanism 21A on the X2 side (the front side) causes the card feed jaws 23 to retreat to the Z2 side (the lower side) of a passing position of the card 2 that is transported by the feed roller 27.

In the card housing section 4, a card collection section 29 is provided on the Z2 side (the lower side) of the card stacking section 6 on the X2 side (the front side). The card 2 that is returned from the card transport section 5 to the X1 side is fed into the card collection section 29 by a guide member 30 that is arranged on the Z2 side (the lower side) of the card stacking section 6 and the chain drive mechanism 24. This guide member 30 also guides the card 2, which is fed out to the X2 side by each of the card feed mechanisms 21A, 21B, to the card transport section 5.

Card Transport Section

In the present embodiment, the card transport section 5 constitutes a separate card transfer unit that is incorporated into neither the card processing section 3 nor the card housing section 4. As illustrated in FIG. 2 and FIG. 3B, the card transport section 5 (the card transport unit) is installed between the card processing section 3 and the card housing section 4; and includes: a card transport mechanism 31 that transports the card 2 in the X-direction; and a carriage transport mechanism 32 that transports a carriage 34 provided with the card transport mechanism 31 in the Y-direction. In a carriage transport path 33 that is provided between the card processing section 3 and the card housing section 4, the carriage transport mechanism 32 moves the carriage 34 in the Y-direction.

As illustrated in FIG. 3B, two guide shafts 35, which extend in parallel in the Y-direction, are arranged in the carriage transport path 33. The carriage 34 is guided in the Y-direction by the guide shafts 35. As illustrated in FIG. 2, the carriage transport mechanism 32 includes: a motor 36 that is arranged on the Z2 side (the lower side) of the carriage transport path 33; and a belt mechanism 37 that is driven by rotation of the motor 36. The carriage 34 is fixed to a belt of the belt mechanism 37. As illustrated in FIG. 1 and FIG. 3B, the guide shafts 35, motor 36, and the belt mechanism 37 are supported by a metal frame 38.

As illustrated in FIG. 1, FIG. 2, and FIG. 3A, the card transport section 5 includes: a metal bracket 39 that covers the carriage transport path 33; and the contactless card reader 8 that is fixed to the bracket 39. The bracket 39 includes: an opposing section 40 that opposes the carriage transport path 33 from the Z1 side (the upper side); and a pair of legs 41, each of which is bent substantially at a right angle from respective end in the Y-direction of the opposing section 40 extending in the Y-direction and extends to the Z1 side (the lower side). A lower end of each of the paired legs 41 is fixed to the frame 38 of the carriage transport mechanism 32. The contactless card reader 8 includes: a substrate 80 that is attached in a manner to close an opening 42 provided to the opposing section 40; and a contactless communication antenna 81 and an IC chip 82 that are arranged on the substrate 80. The contactless communication antenna 81 is a pattern that is made of conductive metal and formed on a surface of the substrate 80. The substrate 80 is also provided with unillustrated wiring patterns that are connected to the contactless communication antenna 81 and the IC chip 82, and the like.

Figure 4A:
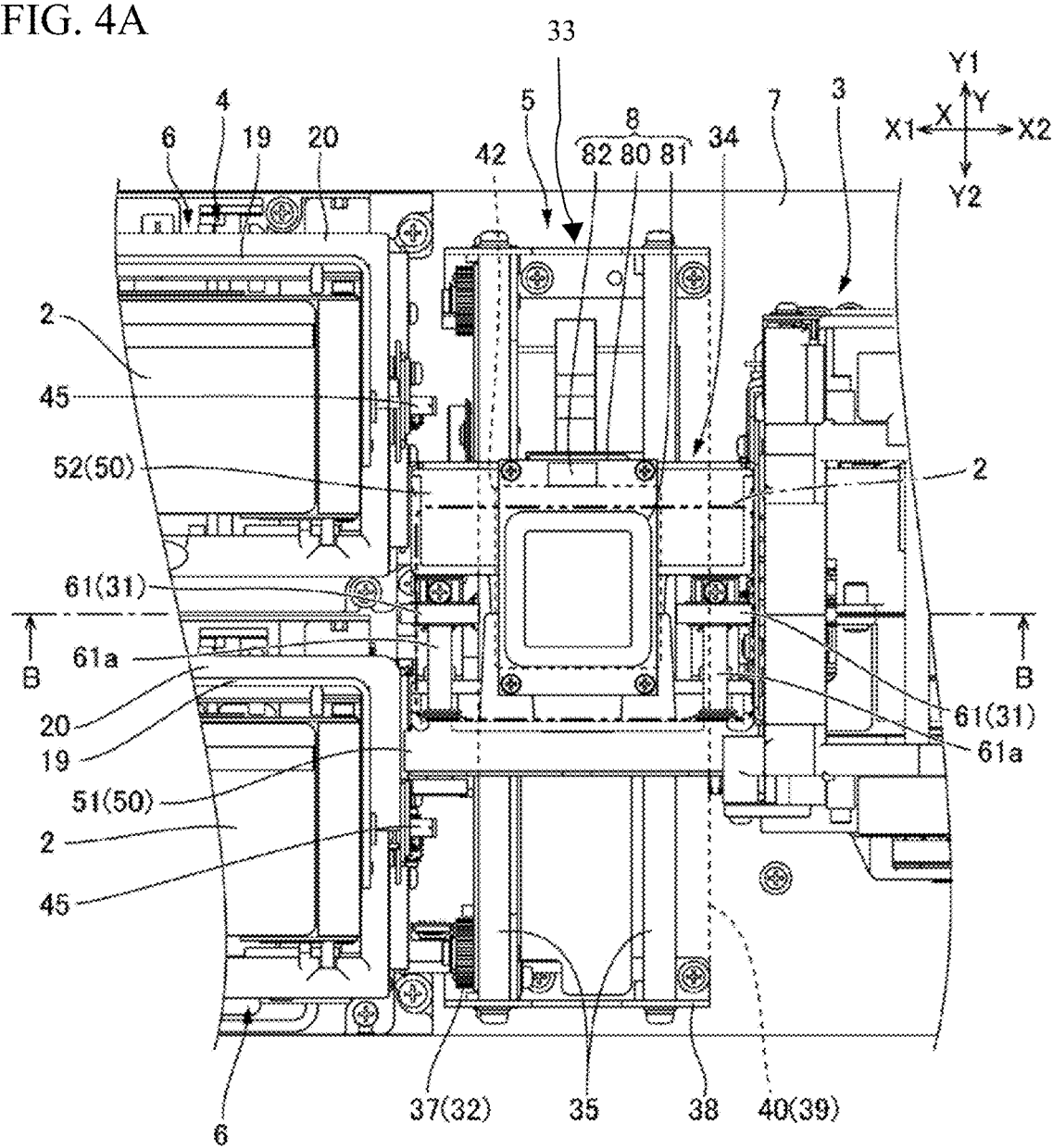
FIG. 4A is a plan view illustrating arrangement of a carriage, a card, and the contactless card reader.
Figure 4B:
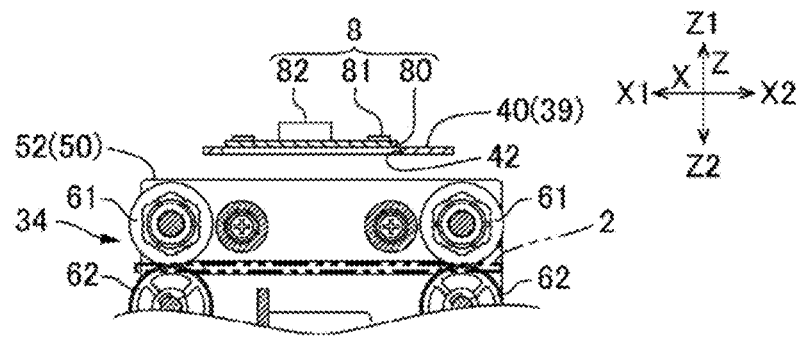
FIG. 4B is a cross-sectional view of the carriage, the card, a bracket, and the contactless card reader.

FIG. 4A is a plan view illustrating arrangement of the carriage 34, the card 2, and the contactless card reader 8, and illustrates a shape of the bracket 39 by broken lines. FIG. 4B is a cross-sectional view of the carriage 34, the card 2, the bracket 39, and the contactless card reader 8 that are taken along position B-B in FIG. 4A. A position of the carriage 34 illustrated in FIG. 4A corresponds a position at which the carriage 34 is stopped when delivering the card 2 to the card processing section 3 (a delivery position). When the carriage 34 is stopped at the delivery position illustrated in FIG. 4A and FIG. 4B and the card transport mechanism 31 is driven, the card 2 is fed into the card transport path 12 of the card processing section 3.

The contactless communication antenna 81 opposes the carriage transport path 33 in the Z-direction via the opening 42 that is provided to the opposing section 40 of the bracket 39. When the carriage 34 is stopped at the delivery position illustrated in FIG. 4A, as illustrated in FIG. 4B, the card 2 that has been taken into the carriage 34 opposes the contactless communication antenna 81 in the Z-direction. While the card transport section 5 stops the carriage 34 at the delivery position illustrated in FIG. 4A and the card transport mechanism 31 transports the card 2 in the X2-direction, the contactless card reader 8 reads the information recorded on the card 2.

Carriage

Figure 5A:
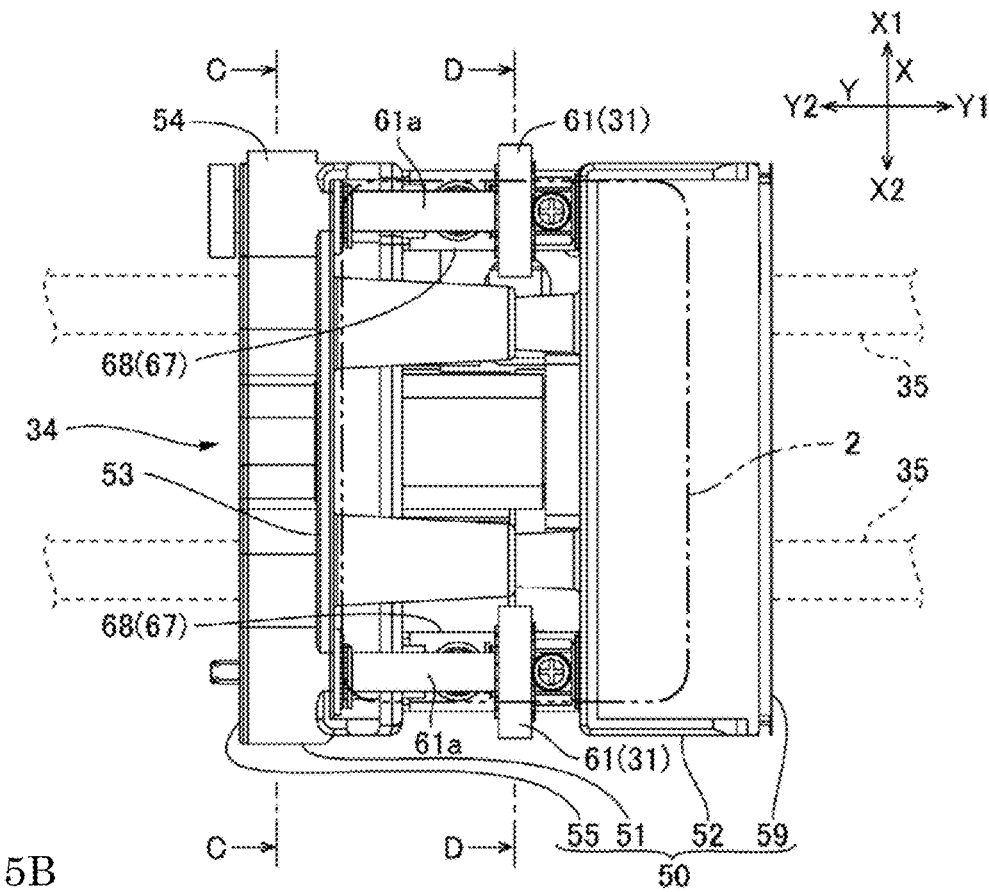
FIG. 5A is a plan view of the carriage.
Figure 5B:
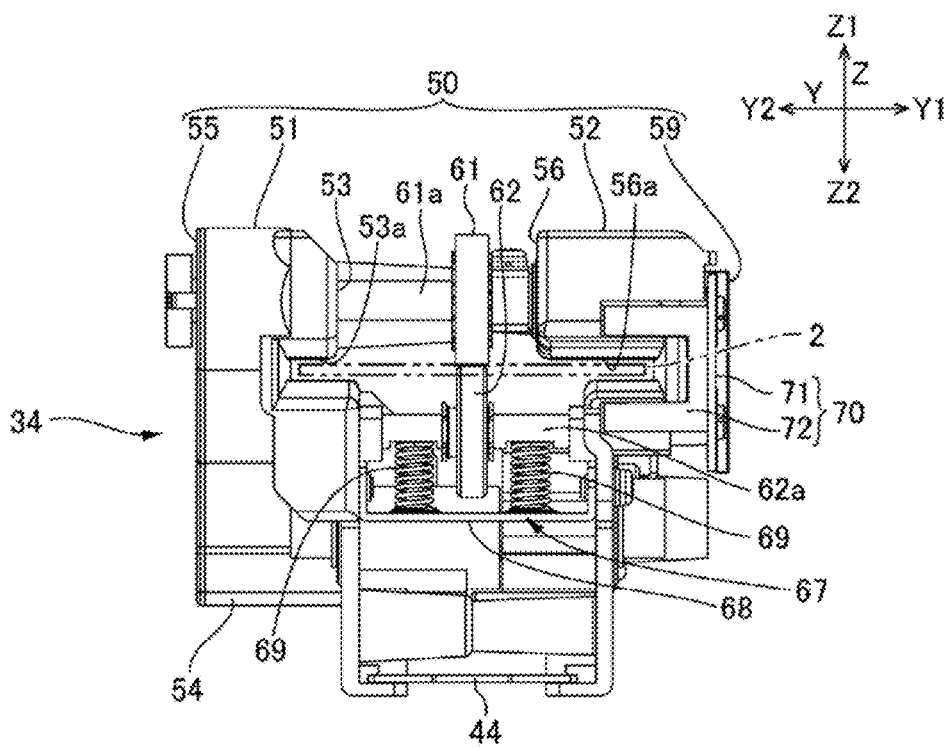
FIG. 5B is a front view of the carriage.
Figure 6A:
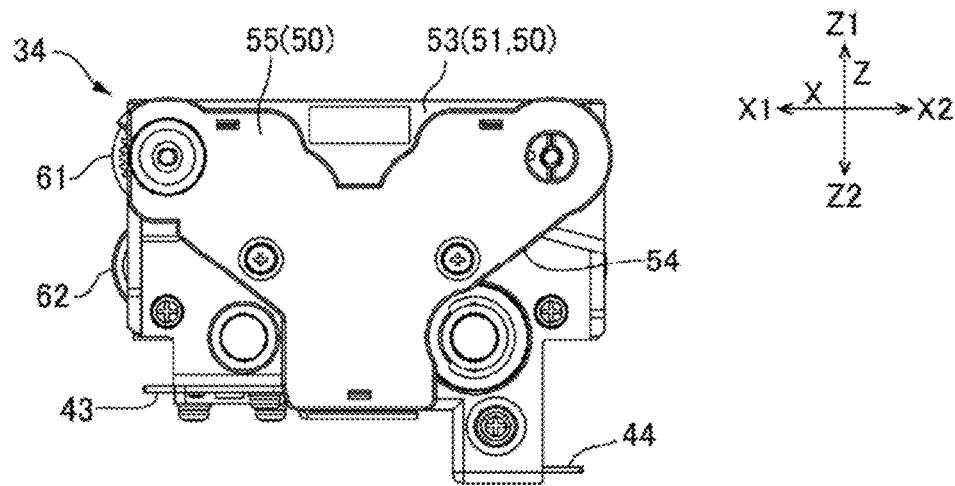
FIG. 6A is a side view of the carriage.
Figure 6B:
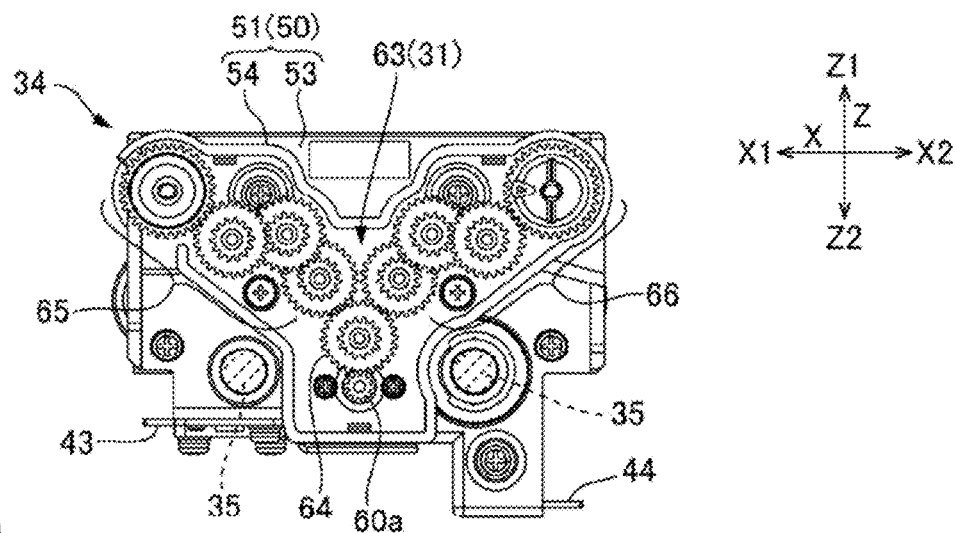
FIG. 6B is a cross-sectional view of the carriage.
Figure 6C:
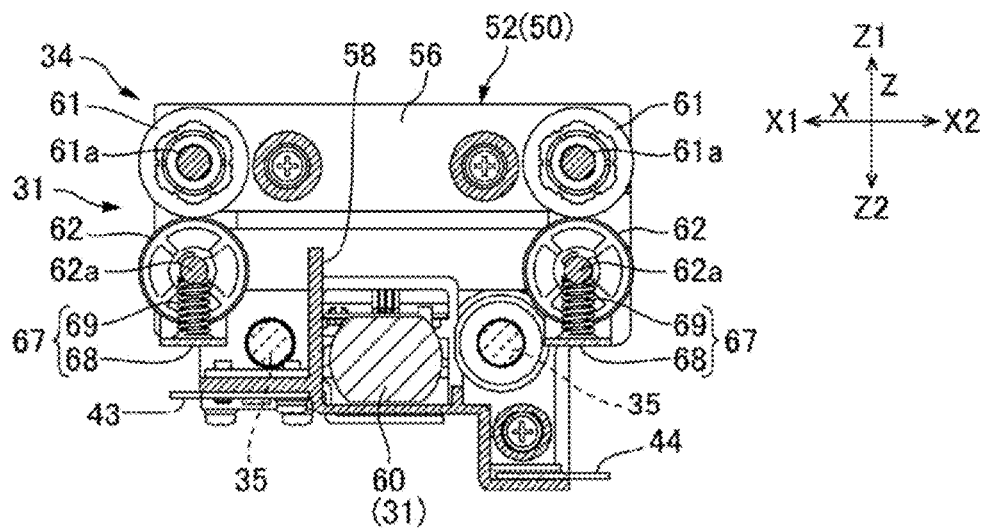
FIG. 6C is a cross-sectional view of the carriage.
Figure 7:
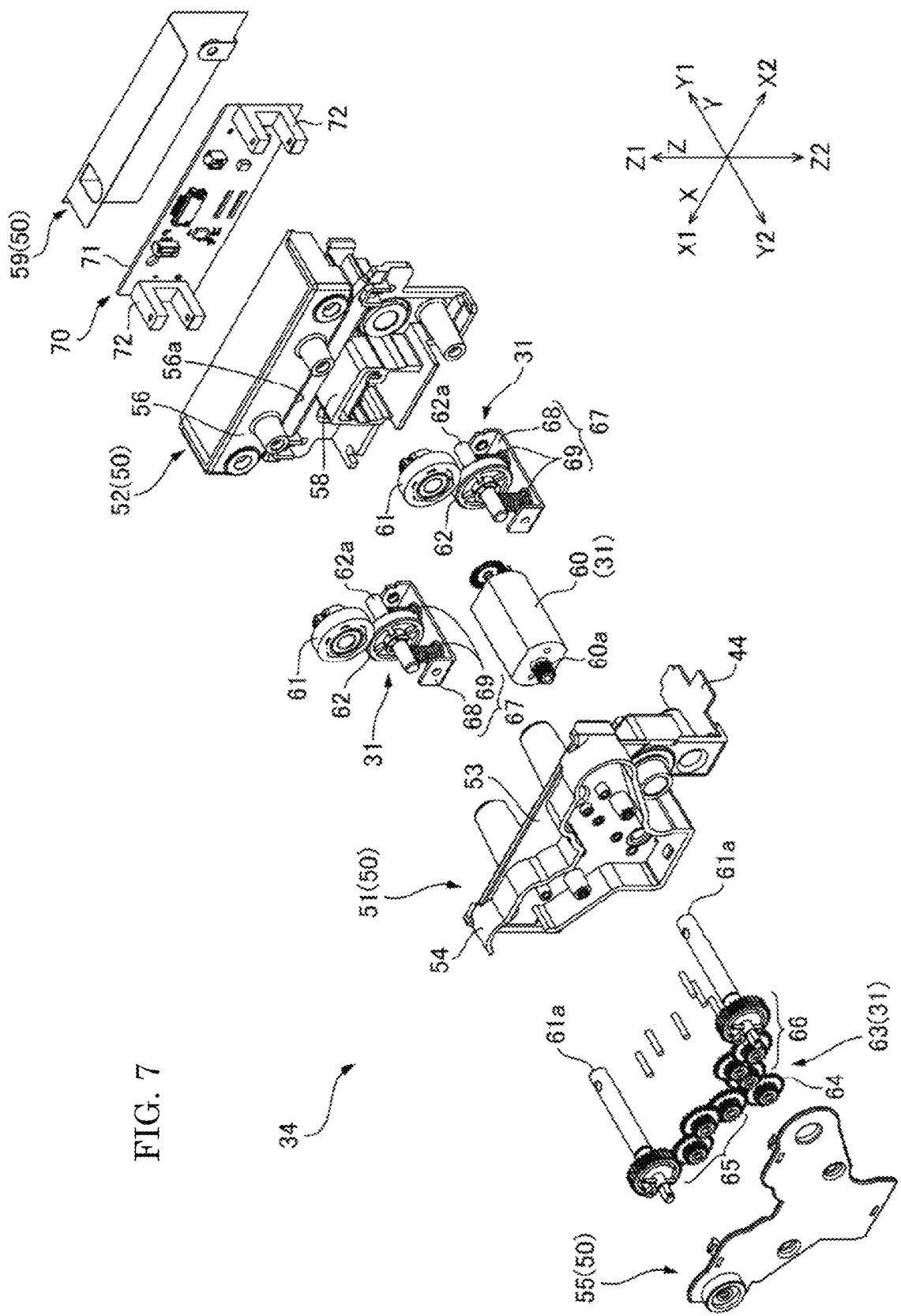
FIG. 7 is an exploded perspective view of the carriage.

FIG. 5A is a plan view of the carriage 34, and FIG. 5B is a front view of the carriage 34. FIG. 6A is a side view of the carriage 34, FIG. 6B is a cross-sectional view of the carriage 34 that is taken along position D-D in FIG. 5A, and FIG. 6C is a cross-sectional view of the carriage 34 that is taken along position C-C in FIG. 5A. FIG. 7 is an exploded perspective view of the carriage 34. As illustrated in FIG. 5, FIG. 6, and FIG. 7, the carriage 34 includes a carriage frame 50 that is made of resin, and the card transport mechanism 31 includes: a motor 60 that is fixed to the carriage frame 50; a drive roller 61 and a driven roller 62 that are rotatably supported by the carriage frame 50; and a gear train 63 that rotates the drive roller 61 by rotation of the motor 60.

As illustrated in FIG. 5B, the drive roller 61 comes in contact with the card 2 from the Z1 side (the upper side), and the driven roller 62 comes in contact with the card 2 from the Z2 side (the lower side). A first rotary shaft 61a that extends in the Y-direction is fixed to a center of the drive roller 61, and a second rotary shaft 62a that extends in the Y-direction is fixed to a center of the driven roller 62. The carriage frame 50 includes: a first frame 51 that is arranged on the Y2 side of the drive roller 61 and driven roller 62; and a second frame 52 that is arranged on the Y1 side of the drive roller 61 and driven roller 62.

As illustrated in FIG. 6B and FIG. 7, the first frame 51 includes: a side plate section 53 that opposes the drive roller 61 and the driven roller 62 from the Y2 side; and a projection wall 54 that is projected to the Y2 side from the side plate section 53 and surrounds the gear train 63. The carriage frame 50 includes a first cover 55 that is made of the resin and abuts an end portion on the Y2 side of the projection wall 54 to be fixed to the first frame 51. The gear train 63 is housed between the first cover 55 and the first frame 51.

The card transport section 5 includes two pairs of the drive roller 61 and the driven roller 62. One of the pairs is arranged in an end portion on the X1 side of the carriage 34, holds an end portion of the card 2, which has been fed out from the card housing section 4, therebetween, and takes the card into the carriage 34. The other pair is arranged in an end portion of the carriage 34 in the X2-direction, and feeds the card 2 toward the card processing section 3.

The gear train 63 includes: a first gear 64 that meshes with a pinion 60a provided on an output shaft of the motor 60; a first gear train 65 that includes plural gears arranged on the X1 side of the first gear 64; and a second gear train 66 that includes plural gears arranged on the X2 side of the first gear 64. The first gear train 65 and the second gear train 66 are configured to be symmetric about a rotation center of the first gear 64 in the X-direction. The first gear train 65 transmits the rotation of the motor 60 to the first rotary shaft 61a that is rotatably supported by an end portion on the X1 side of the first frame 51. The second gear train 66 transmits the rotation of the motor 60 to the first rotary shaft 61a that is rotatably supported by an end portion on the X2 side of the first frame 51. Accordingly, the two pairs of the drive roller 61 and the driven roller 62 rotate synchronously to transport the card 2.

As illustrated in FIG. 5B, the side plate section 53 of the first frame 51 includes a first guide groove 53a that is recessed in the Y2-direction. The second frame 52 includes a side plate section 56 that opposes the side plate section 53 of the first frame 51 in the Y-direction, and the side plate section 56 includes a second guide groove 56a that opposes the first guide groove 53a and is recessed in the Y1-direction. Both ends of the card 2 in the Y-direction are guided by the first guide groove 53a and the second guide groove 56a, and a substantially central portion thereof in the Y-direction is held and transported by the drive roller 61 and the driven roller 62.

As illustrated in FIG. 7, the second frame 52 includes, on the Z2 side of the second guide groove 56a, a motor holding section 58 that is projected to the Y2 side from the side plate section 56. Thus, the motor 60 is held at a position on the Z2 side of the card 2 that is transported by the card transport mechanism 31. As illustrated in FIG. 4B, since the contactless communication antenna 81 is arranged on the Z1 side of the card 2 that is transported by the card transport mechanism 31, the motor 60 is arranged on an opposite side of the card 2 from the contactless communication antenna 81.

As illustrated in FIG. 5B, a pressing mechanism 67 that presses each of the driven rollers 62 to the respective drive roller 61 side (the Z1 side) is arranged between the first frame 51 and the second frame 52. The pressing mechanism 67 includes: a pressing spring support member 68 that extends in the Y-direction on the Z2 side (the lower side) of the second rotary shaft 62a; and a pressing spring 69 that is arranged on each side of the driven roller 62 in the Y-direction and is arranged in a compressed state between the second rotary shaft 62a and the pressing spring support member 68. The pressing spring support member 68 and the pressing spring 69 are made of metal. An end portion on the Y1 side of the pressing spring support member 68 is fixed to the second frame 52, and an end portion on the Y2 side of the pressing spring support member 68 is fixed to the first frame 51.

As illustrated in FIG. 2 and FIG. 6A, the carriage 34 includes: a first detection plate 43 that is projected to the X1 side from an end portion on the Z1 side of the carriage frame 50; and a second detection plate 44 that is projected to the X2 side from the end portion on the Z1 side of the carriage frame 50. The first detection plate 43 and the second detection plate 44 are made of the metal and held by the first frame 51 and the second frame 52. As illustrated in FIG. 2, a photosensor 45 that detects the first detection plate 43 and a photosensor 46 that detects the second detection plate 44 are arranged in the carriage transport path 33. As illustrated in FIG. 4A, the photosensor 45 is arranged at a position that corresponds to each of the two rows of the card stacking sections 6 aligned in the Y-direction. The photosensor 46 is arranged at a position that corresponds to the card processing section 3. The card transport section 5 uses the photosensors 45, 46 to detect the position of the carriage 34 in the Y-direction, and transports the carriage 34.

The carriage 34 includes a card detection section 70. The card detection section 70 includes: a sensor substrate 71 that is fixed to the second frame 52 from the Y1 side; and a photosensor 72 that is arranged on the sensor substrate 71. The carriage frame 50 includes a second cover 59 that is made of the resin and covers the sensor substrate 71 from the Y1 side. The second cover 59 is fixed to the second frame 52 together with the sensor substrate 71.

The single photosensor 72 is arranged on each end of the sensor substrate 71 in the X-direction. Based on a signal of the photosensor 72 on the X1 side, the card detection section 70 detects the card 2 when the card 2 is taken into the carriage 34. In addition, based on the signal of the photosensor 72 on the X2 side, the card detection section 70 detects the card 2 when the card 2 is fed out from the carriage 34. The sensor substrate 71 is provided with a sensor circuit that determines passing of the card 2 on the basis of the signal from the photosensor 72.

Arrangement of Metal Components

In the carriage 34 that is configured as described above, four components (the first frame 51, the second frame 52, the first cover 55, and the second cover 59) that constitute the carriage frame 50 are all made of the resin. Thus, the entire carriage frame 50 is made of the resin. Here, the motor 60, which is mostly constructed of metal components, the pressing mechanism 67 (the pressing spring support member 68 and the pressing spring 69), which is constructed of metal components, and the first detection plate 43 and the second detection plate 44 as metal components are fixed to the carriage frame 50, and all of these are arranged on the Z2 side of the card 2 that is transported by the card transport mechanism 31 (that is, on the opposite side of the card 2 from the contactless communication antenna 81).

In addition to the metal components described above, other components that constitute the card transport mechanism 31 and the sensor substrate 71 that includes the photosensor 72 are fixed to the carriage frame 50. Of the components constituting the card transport mechanism 31, both of the drive roller 61 and the driven roller 62 are made of the resin, and the first rotary shaft 61a and the second rotary shaft 62a are made of the metal. As illustrated in FIG. 5B, the first rotary shaft 61a is arranged on the Z1 side of the card 2 (that is, on the same side as the contactless communication antenna 81 from the card 2). However, as illustrated in FIG. 4A, the first rotary shaft 61a is arranged at a position on the outside of an area that opposes the contactless communication antenna 81 in the Z-direction. In other words, one of the two first rotary shafts 61a is arranged on the X1 side of the area that opposes the contactless communication antenna 81 in the Z-direction, and the other of the two first rotary shafts 61a is arranged on the X2 side of the area that opposes the contactless communication antenna 81 in the Z-direction. Similar to the first rotary shaft 61a, the second rotary shaft 62a is also arranged at a position on the outside of the area that opposes the contactless communication antenna 81 in the Z-direction.

The first gear 64, which constitutes the gear train 63 of the card transport mechanism 31, is made of the resin, and a shaft member that is arranged at a center of the first gear 64 is made of the metal. Similarly, while all of the plural gears in the first gear train 65 and the second gear train 66 are made of the resin, a shaft member that is arranged at a center of each of the gears is made of the metal. In addition, all screws that are used to assemble members constituting the carriage 34 are made of the metal.

The card transport section 5 includes the guide shaft 35 that guides the carriage 34, and the guide shaft 35 is made of the metal. Here, as illustrated in FIG. 6C, the two guide shafts 35 are arranged on both sides of the motor 60 that is held by the carriage frame 50 in the X-direction, and are arranged on the Z2 side (the lower side) of the card 2 that passes between the drive roller 61 and the driven roller 62. Accordingly, the guide shaft 35 is arranged on the Z2 side of the card 2 that is transported by the card transport mechanism 31 (that is, on the opposite side of the card 2 from the contactless communication antenna 81).

Operation of Card Issuing Device

A description will hereinafter be made on an example of operation of the card issuing device 1. The operation, which will be described below, merely constitutes an example of the operation of the card issuing device 1, and thus the operation of the card issuing device 1 is not limited to that described below.

For example, it is assumed that each of the four card stacking sections 6 houses a different type of the cards 2. When a higher-level device such as a financial terminal device, on which the card issuing device 1 is mounted, outputs a card issuing command to issue any type of the card 2, the card transport section 5 moves the carriage 34 to a position on the X2 side of the card stacking section 6 that houses the type of the card 2 specified by the card issuing command. More specifically, the motor 36 is driven to move the carriage 34 in the Y-direction. When the photosensor 45 arranged at the position of the card stacking section 6, at which the carriage 34 should be stopped, detects the first detection plate 43 provided to the carriage 34, the motor 36 is stopped to stop the carriage 34.

When the carriage 34 is stopped, according to the type of the card 2 specified by the card issuing command, the card feed mechanism 21A or the card feed mechanism 21B, which is provided to the card stacking section 6 for housing the specified type of the card 2, is driven to feed out the card 2 housed at the bottom in the cassette 19 toward the carriage 34. More specifically, the motor 25 or the motor 28 is driven to move the card feed jaws 23 of the card stacking section 6, in which the specified card 2 is housed, in the X2-direction, and feeds out the card 2 in the X2-direction.

When the card 2 is fed out from the card housing section 4, the card transport mechanism 31 of the carriage 34 is driven to take the card 2 into the carriage 34. More specifically, the motor 60 is driven to rotate the drive roller 61, and then the drive roller 61 and the driven roller 62 hold the card 2 therebetween to take the card 2 into the carriage 34.

When the card 2 is taken into the carriage 34, the motor 36 of the carriage transport mechanism 32 is driven to move the carriage 34 to the delivery position (see FIG. 4A) on the X1 side of the card processing section 3, and stops the carriage 34. Then, the motor 60 of the card transport mechanism 31 is driven to feed out the card 2 to the card intake port 11 in the card processing section 3. At this time, the contactless card reader 8 reads the information that is recorded on the card 2 transported in the X2-direction.

The card processing section 3 transports the card 2 along the card transport path 12 and, when necessary, drives the printhead 14 to print on the surface of the card 2 and uses the contact card reader 15 to write/read the information on/from the card 2. The card 2 is then fed out from the card issuance port 10.

When a user inserts the card 2 in the card issuance port 10, the card processing section 3 takes the card 2 into the card transport path 12. Then, while the card 2 is transported toward the card intake port 11, the contact card reader 15 reads the information recorded on the card 2. Then, when it is determined that the inserted card 2 is an unnecessary card, the card reversing mechanism 16 sends the card 2 to the card collection section 17 for collection.

Main Effects of Present Embodiment

As it has been described so far, the card issuing device 1 in the present embodiment includes the card transport section 5 that transports the cards 2, which are ejected one-by-one from the card housing section 4, to the card processing section 3. The card transport section 5 is configured as an independent card transport unit that is incorporated into neither the card housing section 4 nor the card processing section 3.

The card transport section 5 (the card transport unit) in the present embodiment includes the contactless card reader 8, and the contactless card reader 8 includes the contactless communication antenna 81 that is held at the position opposing the carriage transport path 33 by the bracket 39 (the support member). With such a configuration, there is no such limitation that the contactless card reader 8 is incorporated into the card processing section 3. Thus, there is no need to use the dedicated contactless card reader 8 that is compatible with the configuration of the card processing section 3. Thus, a degree of freedom in selecting the contactless card reader 8 is high. In addition, the contactless card reader 8 can be changed only by changing design of the bracket 39. Thus, the contactless card reader 8 can easily be changed. Furthermore, while the card 2 is transported from the card housing section 4 to the card processing section 3, the information thereon can be read. Thus, there is no need to provide a dedicated card transport path and a dedicated card transport mechanism only for the contactless card reader 8 to read the information.

In the present embodiment, the contactless communication antenna 81 is arranged on the opposite side of the card 2 from the motor 60, which is mounted on the carriage 34 (that is, on the Z2 side of the card 2). Thus, it is possible to avoid an adverse effect on reading of magnetic information, which is caused by arrangement of the motor 60 as the large metal component near the contactless communication antenna 81.

The carriage 34 in the present embodiment includes the carriage frame 50 that supports the card transport mechanism 31 and the motor 60. The portion of the carriage frame 50 on the contactless communication antenna 81 side from the card 2, which is transported by the card transport mechanism 31, (that is, on the Z1 side of the card 2) is made of the resin. Thus, it is possible to avoid the carriage frame 50 from adversely affecting reading of the magnetic information by the contactless communication antenna 81.

Here, in the present embodiment, not only the portions of the four components (the first frame 51, the second frame 52, the first cover 55, and the second cover 59), which constitute the carriage frame 50, on the contactless communication antenna 81 side from the card 2 are made of the resin. Rather, the four components are entirely made of the resin. However, at least one embodiment of the present invention is not limited to such a configuration. That is, the portion of the carriage frame 50 on the opposite side of the card 2 from the contactless communication antenna 81 (that is, on the Z2 side of the first guide groove 53a and the second guide groove 56a for guiding the card 2) may partially be made of the metal. For example, end portions of the first frame 51 and the second frame 52 in the Z2-direction may be made of the metal.

In the present embodiment, in addition to the motor 60, the pressing mechanism 67, which presses the driven roller 62 toward the drive roller 61, and the first detection plate 43 and the second detection plate 44, each of which is used to detect the position of the carriage 34 in the Y-direction, are fixed as the metal components to the carriage frame 50. These components are arranged on the opposite side of the card 2 from the contactless communication antenna 81 (that is, on the Z2 side of the card 2). Thus, it is possible to avoid these metal components from adversely affecting reading of the magnetic information on the card 2 by the contactless communication antenna 81.

In the present embodiment, the bracket 39 (the support member) that holds the contactless communication antenna 81 includes: the opposing section 40 that opposes the carriage transport path 33 from the Z1 side (the upper side); and the legs 41, each of which is provided at the end of the opposing section 40 in the Y-direction. The contactless card reader 8 includes the substrate 80 that is fixed to the opposing section 40 of the bracket 39, and the contactless communication antenna 81 is arranged on the substrate 80. In the present embodiment, the Z1 side (the upper side) of the carriage transport path 33 is the position opposing the carriage transport path 33 in the Z-direction (the opposing direction) that intersects a movement direction of the carriage 34 (the Y-direction), and thus does not interfere with a movement path of the carriage 34. In addition, the Z1 side (the upper side) of the carriage transport path 33 is the position opposing the carriage transport path 33 in the Z-direction (the opposing direction) that intersects the card transport direction (the X-direction), and thus does not interfere with the card housing section 4 and the card processing section 3. Accordingly, such arrangement can alleviate limitations on arrangement spaces for the bracket 39 and the contactless communication antenna 81. Therefore, a degree of freedom in the shape of the bracket 39 is high, and the degree of freedom in selecting the contactless card reader 8 is high. In addition, since the shape of the bracket 39 can easily be changed, the contactless card reader 8 can easily be changed.

In the present embodiment, the contactless communication antenna 81 opposes the carriage transport path 33 via the opening 42 that is provided to the opposing section 40 of the bracket 39. Accordingly, even in the case where the bracket 39 is made of the metal, due to absence of the metal between the contactless communication antenna 81 and the card 2, it is possible to avoid the bracket 39 from adversely affecting reading of the magnetic information by the contactless communication antenna 81.

In the present embodiment, the card transport section 5 includes the guide shaft 35 that guides the carriage 34 in the Y-direction (the movement direction of the carriage 34), and the guide shaft 35 is arranged on the opposite side of the card 2, which is transported by the card transport mechanism 31, from the contactless communication antenna 81 (that is, on the Z2 side of the card 2). Accordingly, since the metallic guide shaft 35 is not interposed between the card 2 and the contactless communication antenna 81, it is possible to avoid the guide shaft 35 from adversely affecting reading of the magnetic information by the contactless communication antenna 81.

In the present embodiment, the card transport mechanism 31 includes: the drive roller 61 that is made of the resin; the first rotary shaft 61a that is fixed to the center of the drive roller 61; the driven roller 62 that is made of the resin and holds the card 2 with the drive roller 61; the second rotary shaft 62a that is fixed to the center of the driven roller 62; and the gear train 63 that transmits the output shaft of the rotation of the motor 60 to the first rotary shaft 61a. The plural gears constituting the gear train 63 are made of the resin. As described above, in the present embodiment, the roller pair and the gear train 63, which constitute the card transport mechanism 31, are made of the resin except for the shaft members. Thus, the small number of the metal components is arranged near the card 2. Therefore, the arrangement of the metal component near the contactless communication antenna 81 has no significant adverse effect on reading of the magnetic information.

In the present embodiment, the first rotary shaft 61a and the second rotary shaft 62a, to which the roller pair for transporting the card 2 is fixed, are arranged at the positions away from the area that opposes the contactless communication antenna 81 in the Z-direction. Accordingly, even when at least one of the rotary shafts is made of the metal, due to absence of the rotary shaft between the contactless communication antenna 81 and the card 2, it is possible to suppress the adverse effect on reading of the magnetic information by the contactless communication antenna 81.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card transport unit that transports a card ejected one-by-one from a card housing section to a card processing section, the card transport unit comprising:
   a carriage that is moved in a carriage transport path provided between the card housing section and the card processing section;
   a contactless card reader that comprises a contactless communication antenna making contactless communication with the card; and
   a support member that holds the contactless communication antenna at a position opposing the carriage transport path, wherein
   the carriage comprises a card transport mechanism that transports the card in a card transport direction intersecting a movement direction of the carriage, and the card transport mechanism comprises a motor,
   the contactless communication antenna is held at the position opposing the carriage transport path in an opposing direction intersecting the card transport direction and intersecting the movement direction, and
   the motor is arranged on an opposite side of the card, which is transported by the card transport mechanism, from the contactless communication antenna.

2. The card transport unit according to claim 1, wherein
   the carriage comprises a carriage frame that supports the card transport mechanism and the motor, and
   a portion of the carriage frame that is located on the contactless communication antenna side from the card transported by the card transport mechanism is made of resin.

3. The card transport unit according to claim 2, wherein
   the support member comprises: an opposing section that opposes the carriage transport path in an opposing direction intersecting the card transport direction and intersecting the movement direction; and a leg that is provided at each end of the opposing section in the movement direction,
   the contactless card reader comprises a substrate that is fixed to the opposing section, and
   the contactless communication antenna is arranged on the substrate.

4. The card transport unit according to claim 3, wherein
   the contactless communication antenna opposes the carriage transport path via an opening that is provided to the opposing section.

5. The card transport unit according to claim 4 further comprising:
   a guide shaft that guides the carriage in the movement direction, wherein
   the guide shaft is arranged on an opposite side of the card, which is transported by the card transport mechanism, from the contactless communication antenna.

6. The card transport unit according to claim 5, wherein the card transport mechanism comprises:
   a drive roller that is made of resin and a first rotary shaft that is fixed to a center of the drive roller;
   a driven roller that is made of resin and holds the card with the drive roller and a second rotary shaft that is fixed to a center of the driven roller; and
   a gear train that transmits rotation of an output shaft of the motor to the first rotary shaft, wherein
   plural gears that constitute the gear train are made of resin.

7. The card transport unit according to claim 6, wherein
   the first rotary shaft and the second rotary shaft are arranged at positions away from an area that opposes the contactless communication antenna.

8. The card transport unit according to claim 1, wherein
   the support member comprises: an opposing section that opposes the carriage transport path in an opposing direction intersecting the card transport direction and intersecting the movement direction; and a leg that is provided at each end of the opposing section in the movement direction, the contactless card reader comprises a substrate that is fixed to the opposing section, and the contactless communication antenna is arranged on the substrate.

9. The card transport unit according to claim 8, wherein the contactless communication antenna opposes the carriage transport path via an opening that is provided to the opposing section.

10. The card transport unit according to claim 1 further comprising:

a guide shaft that guides the carriage in the movement direction, wherein the guide shaft is arranged on an opposite side of the card, which is transported by the card transport mechanism, from the contactless communication antenna.

11. The card transport unit according to claim 1, wherein the card transport mechanism comprises:

a drive roller that is made of resin and a first rotary shaft that is fixed to a center of the drive roller;

a driven roller that is made of resin and holds the card with the drive roller and a second rotary shaft that is fixed to a center of the driven roller; and a gear train that transmits rotation of an output shaft of the motor to the first rotary shaft, wherein plural gears that constitute the gear train are made of resin.

12. The card transport unit according to claim 11, wherein the first rotary shaft and the second rotary shaft are arranged at positions away from an area that opposes the contactless communication antenna.

* * * * *